United States Patent
Simmen

(10) Patent No.: US 7,783,625 B2
(45) Date of Patent: *Aug. 24, 2010

(54) USING DATA IN MATERIALIZED QUERY TABLES AS A SOURCE FOR QUERY OPTIMIZATION STATISTICS

(75) Inventor: David E. Simmen, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 42 days.

This patent is subject to a terminal disclaimer.

(21) Appl. No.: 11/256,440

(22) Filed: Oct. 21, 2005

(65) Prior Publication Data

US 2006/0036576 A1    Feb. 16, 2006

Related U.S. Application Data

(63) Continuation-in-part of application No. 09/669,556, filed on Sep. 26, 2000.

(60) Provisional application No. 60/171,797, filed on Dec. 22, 1999.

(51) Int. Cl.
*G06F 7/00* (2006.01)

(52) U.S. Cl. .................. 707/713; 707/717; 707/718

(58) Field of Classification Search ........... 707/2, 707/3
See application file for complete search history.

(56) References Cited

U.S. PATENT DOCUMENTS

| | | | |
|---|---|---|---|
| 5,276,870 A * | 1/1994 | Shan et al. ............... 707/2 |
| 5,761,659 A * | 6/1998 | Bertoni ..................... 707/8 |
| 6,026,391 A * | 2/2000 | Osborn et al. ............. 707/2 |
| 6,275,818 B1 * | 8/2001 | Subramanian et al. ...... 707/2 |
| 6,334,128 B1 * | 12/2001 | Norcott et al. ............ 707/5 |
| 6,356,889 B1 * | 3/2002 | Lohman et al. ........... 707/2 |
| 6,363,371 B1 * | 3/2002 | Chaudhuri et al. ........ 707/2 |
| 6,401,079 B1 * | 6/2002 | Kahn et al. ............... 705/30 |
| 6,532,470 B1 * | 3/2003 | Cochrane et al. .......... 707/102 |
| 6,546,381 B1 * | 4/2003 | Subramanian et al. ...... 707/2 |
| 2003/0088541 A1 | 5/2003 | Zilio et al. |
| 2004/0181521 A1 | 9/2004 | Simen |
| 2005/0050041 A1 | 3/2005 | Galindo-Legaria et al. |
| 2005/0097078 A1 | 5/2005 | Lohman et al. |

* cited by examiner

*Primary Examiner*—Apu M Mofiz
*Assistant Examiner*—Cindy Nguyen
(74) *Attorney, Agent, or Firm*—Gates & Cooper LLP

(57) ABSTRACT

Data in materialized query tables (MQTs) are used as statistics for determining the optimal execution plan for a query. When an MQT is defined, it is examined to determine whether its data provides statistics for determining an optimal execution plan for a query. If so, then the MQT is identified, in the RDBMS, as a source for statistics. Information needed to exploit the MQT data as statistics is cataloged in the RDBMS. This information includes a characterization of the type of statistics provided by the MQT, the table and column distributions represented by those statistics, and a query for later retrieving relevant data from the MQT during the query optimization process. When a query is accepted for execution, the cataloged relevant information about MQTs is examined to determine whether an MQT exists that provides statistics relevant to optimization of the query. If such an MQT exists, then the relevant data is retrieved from the MQT using the cataloged query. Using the retrieved statistics, an optimal execution plan may be determined for the query.

29 Claims, 3 Drawing Sheets

USING DATA IN MATERIALIZED QUERY TABLES AS A SOURCE FOR QUERY OPTIMIZATION STATISTICS

CROSS-REFERENCE TO RELATED APPLICATIONS

This application is related to the following co-pending and commonly-assigned applications:

U.S. Utility application Ser. No. 10/807,871, entitled, "QUERY OPTIMIZATION TECHNIQUE FOR OBTAINING IMPROVED CARDINALITY ESTIMATES USING STATISTICS ON PRE-DEFINED QUERIES," filed Mar. 24, 2004, by David E. Simmen, which application is a continuation-in-part of U.S. Utility application Ser. No. 09/669,556, entitled, "A QUERY OPTIMIZATION TECHNIQUE FOR OBTAINING IMPROVED CARDINALITY ESTIMATES USING STATISTICS ON AUTOMATIC SUMMARY TABLES," filed Sep. 26, 2000, by David E. Simmen, which application claims the benefit of U.S. Provisional Application No. 60/171,797, entitled, "A QUERY OPTIMIZATION TECHNIQUE FOR OBTAINING IMPROVED CARDINALITY ESTIMATES USING STATISTICS ON AUTOMATIC SUMMARY TABLES," filed Dec. 22, 1999, by David E. Simmen, all of which applications are incorporated by reference herein.

BACKGROUND OF THE INVENTION

1. Field of the Invention

This invention relates in general to database management systems performed by computers, and in particular, to using data in materialized query tables as a source for query optimization statistics.

2. Description of the Related Art

The use of a Relational Database Management System (RDBMS) is well known in the art. Relational databases are organized into tables that are comprised of rows and columns of data, wherein the rows are tuples and the columns are attributes. The tables are typically stored on direct access storage devices (DASD), such as magnetic or optical disk drives, for semi-permanent storage.

The use of a Structured Query Language (SQL) interface to access data in the RDBMS is also well known in the art. The SQL interface has evolved into a standard language for RDBMS software and has been adopted as such by both the American National Standards Institute (ANSI) and the International Standards Organization (ISO). The SQL interface allows users to formulate relational operations on the tables either interactively, in batch files, or embedded in host languages, such as C and COBOL.

The definitions for SQL provide that a RDBMS should respond to a particular query with a particular set of data given a specified database content, but the method that the RDBMS uses to actually find the required information in the tables is left up to the RDBMS. Typically, there will be more than one method that can be used by the RDBMS to access the required data. Each of these methods is a query execution plan (QEP).

The QEP is a compiled run-time structure used for executing the SQL statement. The QEP is the path the RDBMS uses to get to the data that SQL statements request. For example, an SQL statement might search an entire table space, or it might use an index. The QEP is the key to determining how well an SQL statement performs. The data associated with the QEP is stored in the catalog, or optionally in a plan table.

The RDBMS software uses various data, including statistics in a RDBMS catalog, during bind time to determine which QEP to use. A utility, called RUNSTATS, updates the RDBMS catalog with statistics on table spaces, indexes, tables, and columns. Additionally, when an SQL statement is processed during a bind phase, a QEP is determined for the statement.

Typically, when there are multiple QEPs to choose from, a QEP is selected based on a detailed analysis of the execution costs of each alternative QEP. The RDBMS will select an optimal QEP in order to minimize the computing time or resources used and, therefore, the cost of doing the query.

Certain QEP operations reduce the number of records seen by subsequent operations by applying predicates, and one of the most important tasks of a cost-based optimizer is the estimation of the number of rows, or cardinality, of intermediate results after predicates are applied. Each conjunct, or predicate, of a search condition (e.g., a WHERE or HAVING clause) is assigned a selectivity, which effectively represents the probability that the predicate is true for a given row. A given selectivity estimate is typically derived from statistics about the database, such as the number of distinct values of a referenced column.

A query optimizer relies heavily on accurate statistics on the tables, rows and columns referenced in a query in determining the optimal QEP for a query. In practice, statistics can be missing, of insufficient type, of insufficient detail, or inaccurate, for a variety of reasons. The difference in a QEP chosen with relevant and accurate statistics can perform orders of magnitudes better than a QEP chosen without such statistics. It is therefore essential that a query optimizer exploit all possible sources of statistics.

SUMMARY OF THE INVENTION

To overcome the limitations in the prior art described above, and to overcome other limitations that will become apparent upon reading and understanding the present specification, the present invention discloses a method, apparatus, and article of manufacture for optimizing execution of a query that accesses data stored in one or more base tables in a database of a computer system, comprising using the contents of one or more materialized query tables (MQTs) generated from the base tables as a source of statistics for determining an optimal execution plan for the query. The statistics may comprise table cardinality and column distribution statistics for one or more columns, such as the number of distinct values, high values, low values, cumulative distribution functions, or other types of column distribution statistic that can be computed by a query expression.

When an MQT is defined, it is examined to determine whether its contents can be used as statistics for determining an optimal execution plan for a query that accesses data stored in the base tables in the database. If so, then the MQT is identified, in the RDBMS, as a source for statistics. Information needed to later exploit the MQT contents as statistics is cataloged within the RDBMS. This information includes a characterization of the type of statistics provided by the MQT and a query for later retrieving relevant data during optimization. Moreover, the RDBMS may (optionally) create an index for the MQT, when the MQT is identified as a source for the statistics, in order to expedite retrieving the statistics.

When a query is accepted for execution, the cataloged relevant information about MQTs is examined to determine whether an MQT exists that provides the statistics relevant to optimization of the query. If an MQT exists that may be used as a source for statistics, then the relevant MQT contents is retrieved using the cataloged query. Generally, the statistics are retrieved during a cost-based plan enumeration phase of query optimization. Moreover, the statistics are retrieved when the time needed to retrieve the statistics is negligible compared to the time needed to optimize the query.

Using the retrieved statistics, an optimal execution plan may be determined for the query. Specifically, the cataloged information about the MQT may be exploited to determine the optimal execution plan for the query. Thereafter, the execution plan is performed.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of embodiments of the invention, reference is made to the accompanying drawings which form a part hereof, and which is shown by way of illustration specific embodiments in which the invention may be practiced. It is to be understood that other embodiments may be utilized as structural changes may be made without departing from the scope of the present invention.

Hardware and Software Environment

Figure 1:
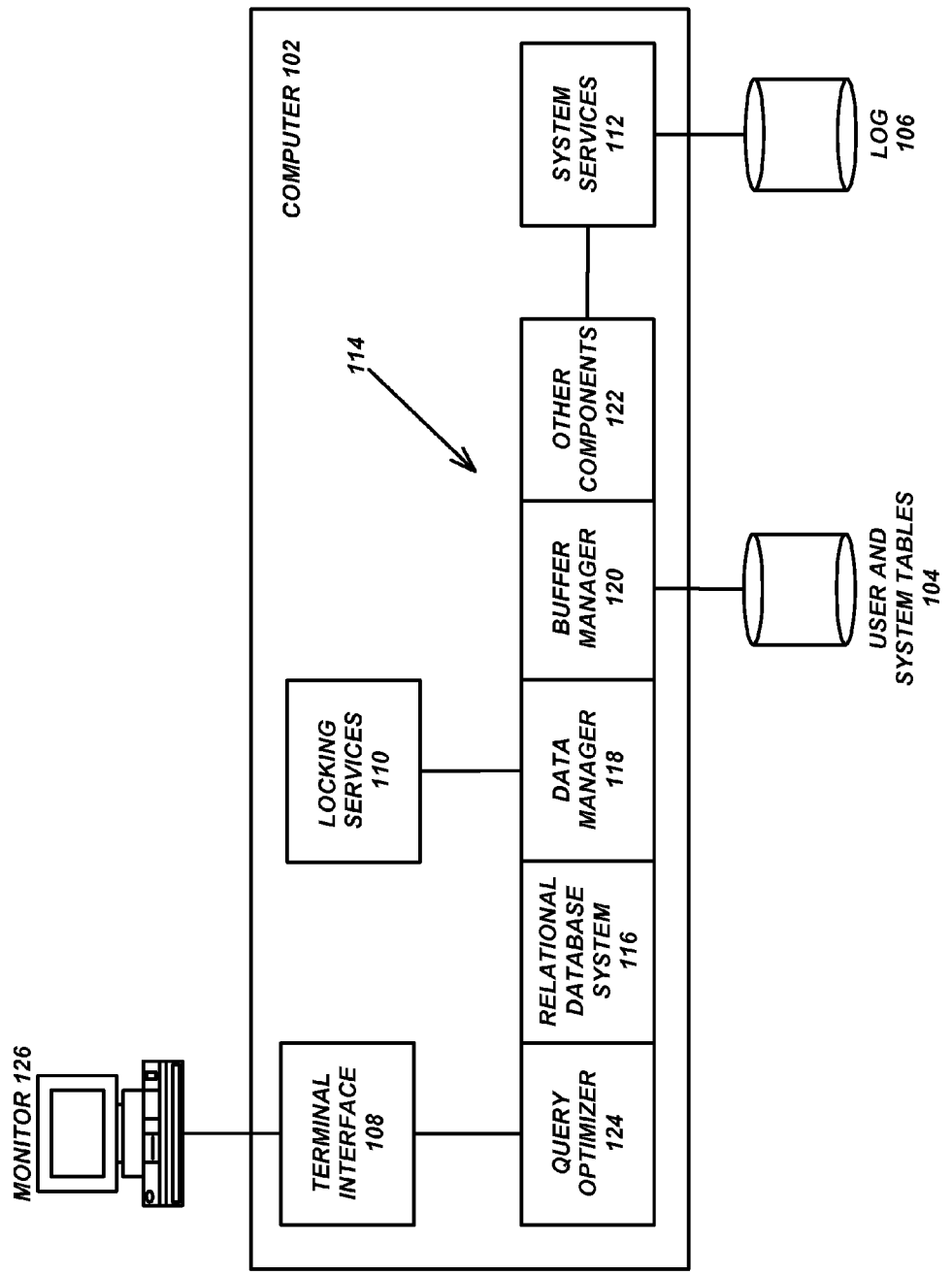
FIG. 1 is a block diagram illustrating components of a hardware environment.

FIG. 1 illustrates an exemplary computer hardware and software environment that could be used with the present invention. In the exemplary environment, a computer system 102 is comprised of one or more processors connected to one or more data storage devices 104 and 106 that store one or more relational databases, such as a fixed or hard disk drive, a floppy disk drive, a CDROM drive, a tape drive, or other device.

Operators of the computer system 102 use a standard operator interface 108 to transmit electrical signals to and from the computer system 102 that represent commands for performing various search and retrieval functions, termed queries, against the databases. In the present invention, these queries conform to the Structured Query Language (SQL) standard, and invoke functions performed by Relational DataBase Management System (RDBMS) software. In some embodiments of the present invention, the DBMS software comprises the DB2® product offered by International Business Machines Corporation. Those skilled in the art will recognize, however, that the present invention has application to any DBMS software whether or not the DBMS software uses SQL.

As illustrated in FIG. 1, a DB2® architecture includes three major components: the Internal Resource Lock Manager (IRLM) 110, the Systems Services module 112, and the Database Services module 114. The IRLM 110 handles locking services, because DB2® treats data as a shared resource, thereby allowing any number of users to access the same data simultaneously, and thus concurrency control is required to isolate users and to maintain data integrity. The Systems Services module 112 controls the overall DB2® execution environment, including managing log data sets 106, gathering statistics, handling startup and shutdown, and providing management support.

At the center of the DB2® architecture is the Database Services module 114. The Database Services module 114 contains several submodules, including the Relational Database System (RDS) 116, the Data Manager 118, the Buffer Manager 120 and other components 122 such as an SQL compiler/interpreter. These submodules support the functions of the SQL language, i.e. definition, access control, interpretation, compilation, database retrieval, and update of user and system data. Additionally, a Query Optimizer 124 works with these submodules to optimize queries for execution.

The present invention is generally used in optimizing SQL statements executed under the control of the Database Services module 114. The Database Services module 114 retrieves or receives the SQL statements, wherein the SQL statements are generally stored in a text file on the data storage devices 104 and 106 or are interactively entered into the computer system 102 by an operator via a monitor or terminal 126. The Database Services module 114 then derives or synthesizes instructions from the SQL statements for execution by the computer system 102, wherein the Query Optimizer 124 optimizes the instructions for execution. Generally, the RDBMS software, the SQL statements, and the instructions derived therefrom, are all tangibly embodied in and/or readable from a computer-readable medium, e.g. one or more of the data storage devices 104 and 106.

Moreover, the RDBMS software, the SQL statements, and the instructions derived therefrom, are all comprised of instructions which, when read and executed by the computer system 102, causes the computer system 102 to perform the steps or functions necessary to implement and/or use the present invention. Under control of an operating system, the RDBMS software, the SQL statements, and the instructions derived therefrom, may be loaded from the data storage devices 104 and 106 into a memory of the computer system 102 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Query Optimization

The present invention discloses a novel technique performed by the Query Optimizer 124 for exploiting the data in materialized query tables (MQT) as query optimization statistics. MQTs are typically created to serve as starting points to answer other queries, thereby speeding up their execution. However, in the present invention, the data in MQTs also provides a variety of valuable statistics for use by Query Optimizer 124, such as table cardinality and column distribution statistics for (one or more) columns, such as the number of distinct values, high and low value, frequency counts, cumulative distribution functions, or other types of column distribution statistics that can be computed by a query expression.

There are two main aspects to the present invention:

(1) The present invention extends the MQT definition process of the RDBMS with the capability to catalog information about MQTs whose data can be used as query optimization statistics. This information includes a characterization of the type of statistics provided by the MQT, the table and column distributions represented by those statistics, and a query for later retrieving relevant data from the MQT during the query optimization process.

(2) The present invention extends the query optimization process of the RDBMS with the capability to exploit the data in MQTs (those cataloged during the MQT definition process) as a source of statistics. Specifically, the Query Optimizer 124 examines the cataloged MQTs, and determines which MQTs contain data that can be exploited as statistics for optimization of the query. The Query Optimizer 124 retrieves this statistical information using the query cataloged with the MQT during the definition process. The data retrieved by the query is mapped to the Query Optimizer 124 data structures used to represent the corresponding type of statistic, for the corresponding tables and columns, as specified during the MQT definition process. The statistics are then exploited in the usual way during the cost-based plan enumeration phase of optimization. No additional changes to the optimization process are required.

To illustrate the operation of the present invention, consider the following query:

Query 1:
select sales_date, vin, selling_price
from car_sales
where make='honda' and model='accord'
order by selling_price desc Query 1 asks for the information on Honda Accords sales, ordered by highest to lowest selling price. A first possible QEP might use an index on the make and model columns to retrieve sales information for Honda Accords, followed by a descending sort on the selling_price column. A second possible QEP might use a descending index on the selling_price column to avoid the sort. The first QEP would perform best if the predicates make='honda' and model='accord' are very selective together, resulting in few rows to sort; otherwise, the second QEP that avoids a potentially expensive sort might perform substantially better.

There are a couple of factors that could cause the Query Optimizer 124 to errantly favor the first QEP. First, the Query Optimizer 124 treats the selectivity of individual predicates independently for lack of information as to the combined distribution of the columns referenced in the predicates. In the absence of such statistics, the Query Optimizer 124 can severely underestimate the combined selectivity of multiple predicates.

Second, if detailed distribution statistics are unavailable (perhaps due to space limitations or database administrator error), the Query Optimizer 124 must assume that the distribution of values over a domain are uniform, thus leading the Query Optimizer 124 to either underestimate or over-estimate the selectivity of one or more predicates, depending on whether the values referenced in the predicates are more or less frequent than the norm.

Clearly, in the above example, the make and model columns should not be treated independently, as only Honda sells Accords. Moreover, even if there was information on the combined make and model domain, Honda Accords are one of the best selling models, and thus, without detailed distribution statistics, the Query Optimizer 124 would underestimate the combined selectivity of the predicates make='honda' and model='accord' if it assumed this model's sales fit the norm.

The MQT car_sales_count, defined in Query 2, maintains the exact number of cars sold for each make and model column combination.

Query 2:
create table car_sales_count as
(select make, model, count(*) as count
from car_sales
group by make, model)
data initially deferred refresh immediate The car_sales_count MQT would typically be created for use as a starting point to answer queries looking for aggregate information about car_sales. This is the typical usage of MQTs; however, the MQT can be looked at in a novel way (which is the key idea behind the present invention). Specifically, each row of the MQT contains the number of rows of the car_sales table having a specific make and model value combination.

Thus, after the MQT is populated, the Query Optimizer 124 need only issue Query 3 to retrieve the detailed statistical information needed to select the appropriate QEP for Query 1.

Query 3:
select count
from car_sales_count
where make='honda' and model='accord'

The Query Optimizer 124 uses the data returned from Query 3 to determine the actual combined selectivity of the predicates make='honda' and model='accord'. This information allows the Query Optimizer 124 to take into account the correlation between the make and model columns, along with the non-uniformity of the combined domains, thereby leading to the selection of a QEP that might perform orders of magnitude better than a QEP selected without this information. Note that the distribution statistics provided by the car_sales_count MQT never become stale, because the MQT is declared so that it is incrementally refreshed by the RDBMS when changes to the car_sales table are made.

In addition to providing detailed frequency distribution statistics for a combined column domain, as illustrated in the previous example, the data in MQTs can provide a variety of valuable statistics typically used by Query Optimizer 124, such as table cardinality and column distribution statistics for (one or more) columns, such as number of distinct values, high and low value, cumulative distribution functions, or any other type of column distribution statistic that can be computed by a query expression.

The following MQT definitions illustrate some of those possibilities.

Query 4:
create table total_car_sales as
(select count(*) as count
from car_sales)
data initially deferred refresh deferred The data in the total_car_sales MQT, defined in Query 4, maintains the exact table cardinality of the car_sales table. The table cardinality statistic provides the foundation for estimating the cardinality of intermediate results.

Query 5:
create table num_dealers as
(select count (distinct dealer) as count
from car_sales)
data initially deferred refresh deferred The data in the num_dealers MQT, defined in Query 5, maintains the number of distinct values for the dealer column. The number of distinct values for a column can be used to determine the effect of equality predicates and aggregation when column data is uniformly distributed.

Query 6:
create table high_low_price_car as
(select min (selling_price) as low, max (selling_price) as high
from car_sales)
data initially deferred refresh deferred The data in the high_low_price_car MQT, defined in Query 6, maintains the high and low value for the selling_price column. The high and low values for a column can be used to determine the effect of range predicates when the column data is uniformly distributed.

The data in the selling_price_CDF MQT, defined in Query 7, maintains cumulative distribution statistics for the selling_price column of the car_sales table. That is, each row of the MQT contains a selling_price value, and the number of car_sales rows having a selling_price value less than or equal to that value. Cumulative distribution statistics can be used to determine the effect of range predicates when column data is non-uniformly distributed.

Query 7:
create table selling_price_CDF as
(select distinct selling_price,
sum (selling_price) over (order by selling_price) as total
from car_sales)
data initially deferred refresh deferred Thus, the present invention discloses the use of the data in MQTs as a source of query optimization statistics that can be used to dramatically improve the efficiency of the execution plan chosen for a query. As noted, the MQT definition process is extended with the capability to catalog information about MQTs whose data can be used as a source of query optimization statistics. Specifically, this aspect of the invention characterizes the type of statistics provided by the MQT, the table and column distributions represented by those statistics, and a query for later retrieving relevant data from the MQT during the query optimization process.

Considering again the example of Query 4 set forth above, when the definition of the car_sales_count MQT is processed by the RDBMS, the MQT is identified as a source of detailed distribution statistics for the combined columns make and model of the car_sales table. A query for retrieving those statistics, illustrated in Query 8, is then built and cataloged along with the other relevant information about the MQT's usage as a source of statistics. The Query Optimizer 124 simply substitutes the make and model values referenced in the predicates of the query being optimized for the variables in Query 8, and executes the query to retrieve the appropriate frequency count from the MQT.

Query 8:
select count
from car_sales-count
where make=? and model=?

As noted above, the present invention also extends the query optimization process with the capability to exploit the data in MQTs cataloged during the MQT definition process as a source of statistics.

Finally, the strategy of probing the MQT for statistics is practical if the time needed to execute the statistics gathering routine is negligible compared to the time needed to optimize the query. This would certainly be more likely if there are appropriate indexes available to speed up the data retrieval. Thus, the RDBMS could either avoid flagging the MQT as a source of statistics if such an index did not exist, or it could force the creation of such an index at the time the MQT is identified as a source of statistics. For example, a unique index could be created on the combined columns make and model of the car_sales_count MQT in Query 2, thereby allowing direct access to detailed statistics for a given make and model.

Logic of the Preferred Embodiment

Figure 2:
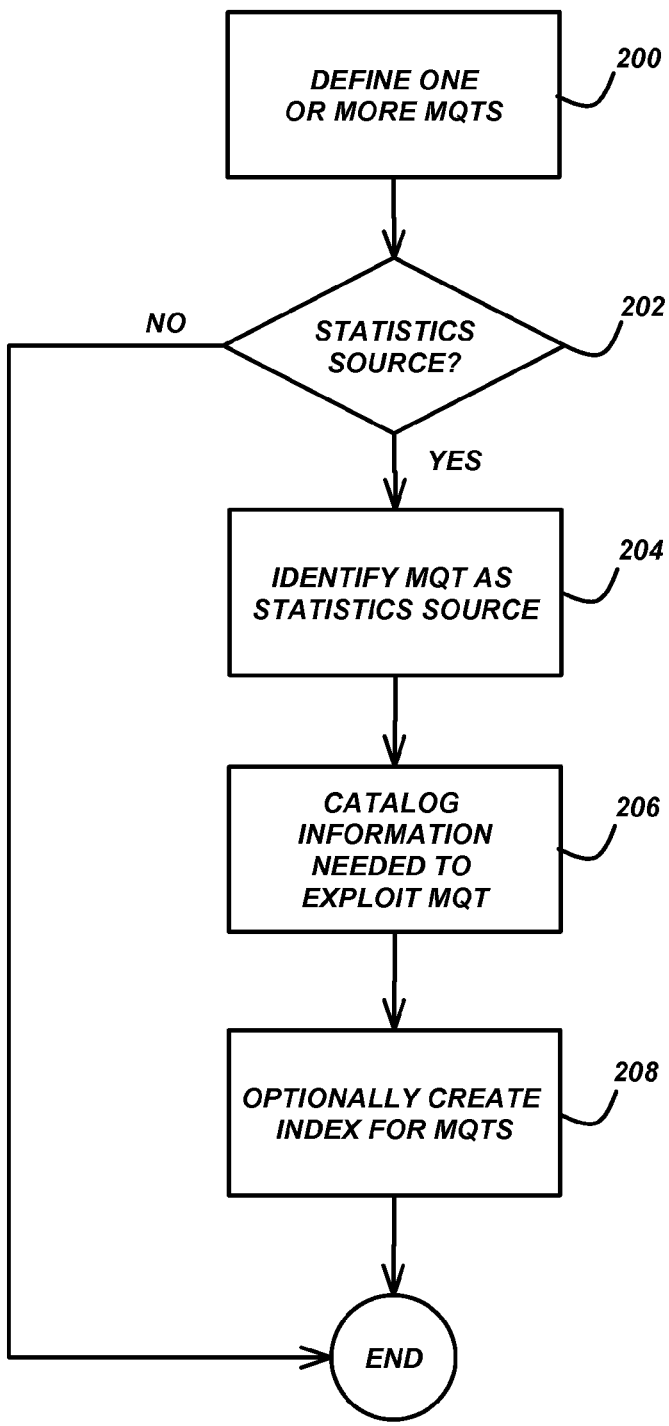
FIGS. 2 and 3 are flow charts illustrating the logic performed by the relational database management system according to the preferred embodiment of the present invention.
Figure 3:
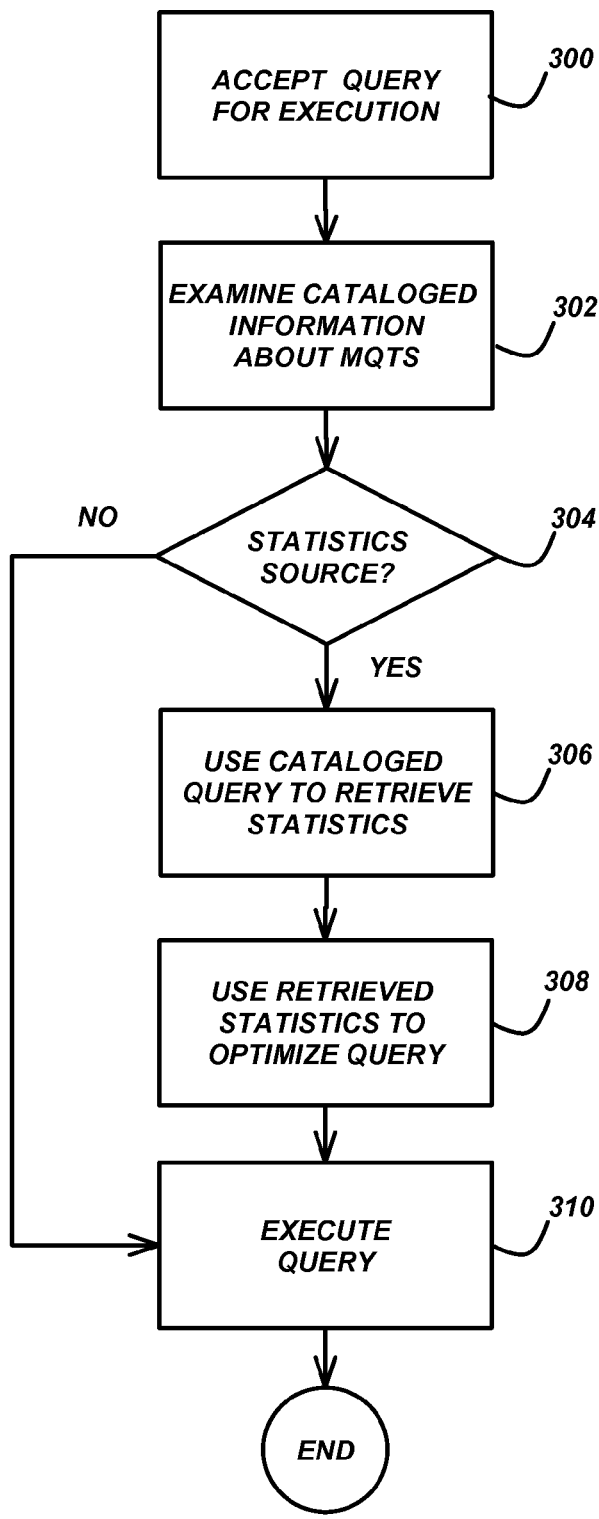

FIGS. 2 and 3 are flow charts illustrating the logic performed by the RDBMS according to the preferred embodiment of the present invention. This logic describes the steps or functions performed by the RDBMS when optimizing execution of a query that accesses data stored in one or more base tables in the database of the computer system 102.

Referring to FIG. 2, Block 200 represents one or more materialized query tables (MQTs) being defined, wherein the MQTs, when executed, are generated from the base tables identified above.

Block 202 is a decision block that determines whether the MQT may be used as a source for statistics for determining an optimal execution plan for a query that accesses data stored in the base tables in the database. If so, then control transfers to Block 204; otherwise, the logic ends.

Block 204 represents identifying the MQT, in the RDBMS, as a source for statistics.

Block 206 represents cataloging relevant information needed to exploit the data in the MQT as query optimization statistics. This Block includes cataloging information that characterizes the type of statistics provided by the MQT, the table and column distributions provided by the MQT, and a query for later retrieving the data in the MQT during the query optimization process. The statistics may comprise table cardinality and column distribution statistics for one or more columns. The column distribution statistics may comprise the number of distinct values, high values, low values, cumulative distribution functions, or other types of column distribution statistic that can be computed by a query expression.

Block 208 represents (optionally) creating an index for the MQT, in order to expedite retrieving the statistics.

Thereafter, the logic ends.

Referring to FIG. 3, Block 300 represents accepting a query for execution.

Block 302 represents examining the cataloged relevant information about MQTs to determine whether an MQT exists that provides statistics relevant to optimization of the query.

Block 304 is a decision block that determines whether a MQT exists that may be used as a source for statistics for determining an optimal execution plan for the query. If so, then control transfers to Block 306; otherwise, control transfers to Block 310.

Block 306 represents retrieving the data, i.e., statistics, from the MQT relevant to the optimization of the query using the cataloged query. Generally, the data is retrieved from the MQT during a cost-based plan enumeration phase of query optimization. Moreover, the data is retrieved from the MQT when the time needed to retrieve the data from the MQT is negligible compared to the time needed to optimize the query.

Block 308 represents using the retrieved statistics to determine an optimal execution plan for the query. Specifically, this Block represents exploiting the cataloged relevant information about the MQT to determine the optimal execution plan for the query.

Block 310 represents the execution plan being performed. Of course, this Block may also represent other optimizations being performed, in addition to the optimization process described herein.

Thereafter, the logic ends.

CONCLUSION

This concludes the description of embodiments of the invention. The following describes some alternative embodiments for accomplishing the present invention. For example, any type of computer, such as a mainframe, minicomputer, or personal computer, or computer configuration, could be used with the present invention. In addition, many types of databases could benefit from the present invention.

The foregoing description of embodiments of the invention has been presented for the purposes of illustration and description. It is not intended to be exhaustive or to limit the invention to the precise forms disclosed. Many modifications and variations are possible in light of the above teaching. It is intended that the scope of the invention be limited not by this detailed description, but rather by the claims appended hereto.

What is claimed is:

1. A method of optimizing execution of a query that accesses data stored in one or more base tables in a database of a computer system, comprising:
    performing a first query that accesses the data stored in the base tables, in order to create at least one materialized query table (MQT);
    using data stored in the MQT as statistics data for determining an optimal execution plan for a second query that accesses the data stored in the base tables; and
    performing the second query using the optimal execution plan to access the data stored in the base tables in the database for presentation to a user.

2. The method of claim 1, wherein the statistics comprise table cardinality.

3. The method of claim 1, wherein the statistics comprise column distribution statistics for one or more columns.

4. The method of claim 3, wherein the column distribution statistics for one or more columns comprise a number of distinct values, high values, low values, cumulative distribution functions, or other types of column distribution statistic that can be computed by a query expression.

5. The method of claim 1, further comprising identifying the MQT as a source for statistics when the MQT is defined.

6. The method of claim 5, further comprising creating an index for the MQT when the MQT data is identified as a source for statistics, in order to expedite retrieving the statistics.

7. The method of claim 5, wherein the identifying step further comprises cataloging relevant information about the MQT as the source of statistics.

8. The method of claim 7, further comprising cataloging a query for retrieving data in the MQT when the MQT is identified as a source for the statistics.

9. The method of claim 7, further comprising cataloging a characterization of a type of statistics provided by the MQT when the MQT is identified as a source for the statistics.

10. The method of claim 7, further comprising cataloging table and columns distributions provided by the MQT when the MQT is identified as a source for the statistics.

11. The method of claim 7, further comprising exploiting the cataloged relevant information about the MQT to determine the optimal execution plan for the second query.

12. The method of claim 11, further comprising examining the cataloged relevant information about the MQT to determine whether the MQT provides statistics relevant to optimization of the second query.

13. The method of claim 12, further comprising retrieving data from the MQT relevant to the optimization of the second query using the cataloged query.

14. The method of claim 13, wherein the data is retrieved from the MQT when the time needed to retrieve the data is negligible compared to the time needed to optimize the second query.

15. A computer-implemented apparatus for optimizing execution of a query that accesses data stored in one or more base tables in a database of a computer system, comprising:
    (a) a computer system having a data storage device coupled thereto, the data storage device storing the database; and
    (b) logic, performed by the computer system, for performing a first query that accesses the data stored in the base tables, in order to create at least one materialized query table (MQT); for using data stored in the MQT as statistics data for determining an optimal execution plan for a second query that accesses the data stored in the base tables; and for performing the second query using the optimal execution plan to access the data stored in the base tables in the database for presentation to a user.

16. An article of manufacture comprising a program storage device for storing instructions that, when read and executed by a computer system, result in the computer system performing a method of optimizing execution of a query that accesses data stored in one or more base tables in a database of the computer system, comprising:
    performing a first query that accesses the data stored in the base tables, in order to create at least one materialized query table (MQT);
    using data stored in the MQT as statistics data for determining an optimal execution plan for a second query that accesses the data stored in the base tables; and
    performing the second query using the optimal execution plan to access the data stored in the base tables in the database for presentation to a user.

17. The article of claim 16, wherein the statistics comprise table cardinality.

18. The article of claim 16, wherein the statistics comprise column distribution statistics for one or more columns.

19. The article of claim 18, wherein the column distribution statistics for one or more columns comprise a number of distinct values, high values, low values, cumulative distribution functions, or other types of column distribution statistic that can be computed by a query expression.

20. The article of claim 16, further comprising identifying the MQT as a source for statistics when the MQT is defined.

21. The article of claim 20, further comprising creating an index for the MQT when the MQT data is identified as a source for statistics, in order to expedite retrieving the statistics.

22. The article of claim 20, wherein the identifying step further comprises cataloging relevant information about the MQT as the source of statistics.

23. The article of claim 22, further comprising cataloging a query for retrieving data in the MQT when the MQT is identified as a source for the statistics.

24. The article of claim 22, further comprising cataloging a characterization of a type of statistics provided by the MQT when the MQT is identified as a source for the statistics.

25. The article of claim 22, further comprising cataloging table and columns distributions provided by the MQT when the MQT is identified as a source for the statistics.

26. The article of claim 22, further comprising exploiting the cataloged relevant information about the MQT to determine the optimal execution plan for the second query.

27. The article of claim 26, further comprising examining the cataloged relevant information about the MQT to determine whether the MQT provides statistics relevant to optimization of the second query.

28. The article of claim 27, further comprising retrieving data from the MQT relevant to the optimization of the second query using the cataloged query.

29. The article of claim 28, wherein the data is retrieved from the MQT when the time needed to retrieve the data is negligible compared to the time needed to optimize the second query.

* * * * *